(12) United States Patent
Wachsmann

(10) Patent No.: US 8,553,546 B2
(45) Date of Patent: Oct. 8, 2013

(54) TECHNIQUE FOR SOFT BIT SCALING

(75) Inventor: Udo Wachsmann, Schwabach (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 284 days.

(21) Appl. No.: 12/867,249

(22) PCT Filed: Feb. 9, 2009

(86) PCT No.: PCT/EP2009/051443
§ 371 (c)(1),
(2), (4) Date: Aug. 11, 2010

(87) PCT Pub. No.: WO2009/101049
PCT Pub. Date: Aug. 20, 2009

(65) Prior Publication Data
US 2010/0309810 A1 Dec. 9, 2010

Related U.S. Application Data

(60) Provisional application No. 61/027,550, filed on Feb. 11, 2008, provisional application No. 61/087,326, filed on Aug. 8, 2008.

(30) Foreign Application Priority Data

Aug. 6, 2008 (EP) ..................... 08014066

(51) Int. Cl.
*H04J 1/16* (2006.01)
(52) U.S. Cl.
USPC ........... 370/232; 370/334; 375/340; 375/341; 455/67.11; 455/63.1; 455/423
(58) Field of Classification Search
USPC .......... 370/252, 232, 229, 333, 334; 455/423, 455/67.11, 430, 63.1; 714/780; 375/340, 375/341, 130
See application file for complete search history.

(56) References Cited

U.S. PATENT DOCUMENTS

| | | | |
|---|---|---|---|
| 5,944,844 A | 8/1999 | Piirainen et al. | |
| 2004/0081259 A1 | 4/2004 | Ammer et al. | |
| 2004/0098652 A1* | 5/2004 | Sternberg et al. | 714/752 |
| 2004/0219883 A1* | 11/2004 | Pauli et al. | 455/67.11 |
| 2005/0025076 A1 | 2/2005 | Chaudhuri et al. | |
| 2006/0135080 A1 | 6/2006 | Khandekar | |

(Continued)

FOREIGN PATENT DOCUMENTS

| | | |
|---|---|---|
| WO | WO 00/74247 A | 12/2000 |
| WO | WO 2007/092744 A2 | 8/2007 |

OTHER PUBLICATIONS

Bruennghaus et al. "Link Performance Models for System Level Simulations of Broadband Radio Access Systems," 16th International Symposium on Personal, Indoor and Mobile Radio Communications. Berlin. Germany Sep. 11-14, 2005. vol. 4. pp. 2306-2011. XP010828103.

(Continued)

*Primary Examiner* — Dady Chery

(57) ABSTRACT

A technique for determining in a fading channel environment a scaling factor for soft bit quantization is proposed. In a method realisation, the technique includes repeatedly determining an SNR value for the fading channel, calculating a weighted average based on a plurality of the SNR values, wherein weighting is performed such that contributions of extremal SNR values are attenuated, and determining the scaling factor for soft bit quantization dependent on the weighted average.

15 Claims, 5 Drawing Sheets

(56) References Cited

U.S. PATENT DOCUMENTS

2007/0076810 A1 4/2007 Herrera et al.
2009/0279445 A1 11/2009 Nogami et al.

OTHER PUBLICATIONS

Ericsson: "Effective-SNR Mapping for Modeling Frame Error Rates in Multiple-state Channels". 3GPP Project 2.

Dahlman, et al: "3G Evolution: HSPA and LTE for Mobile Broadband". 2007.

Jeong, et al: "Optimal Quantization for Soft-Decision Turbo Decoder". Dot Wireless, Inc. San Diego, CA USA. 1999.

Michel, et al: "Turbo-Decoder Quantization for UMTS". IEEE Communication Letters, vol. 5, No. 2. pp. 55-57, Feb. 2001.

* cited by examiner

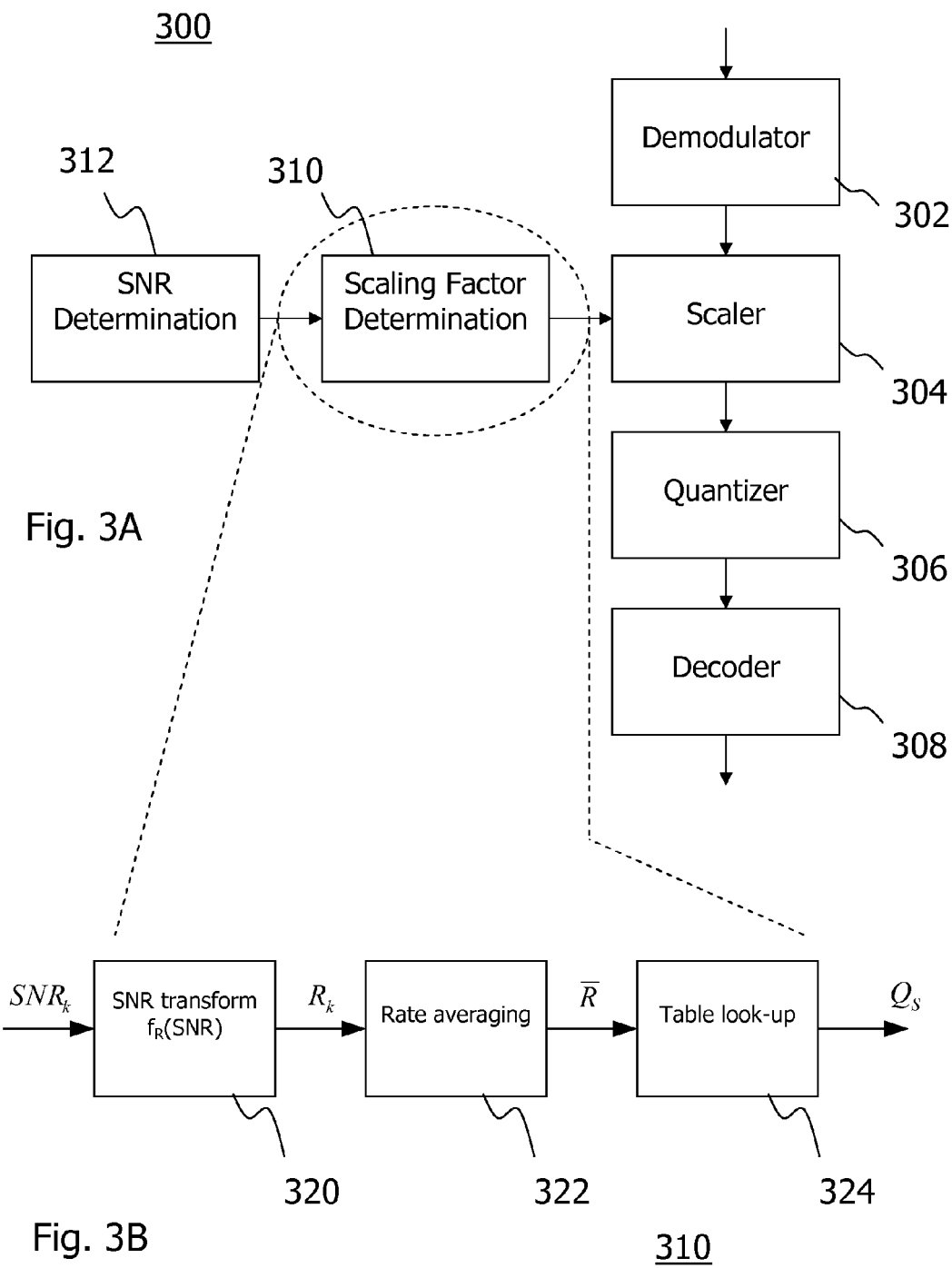

TECHNIQUE FOR SOFT BIT SCALING

This application claims the benefit of U.S. Provisional Application No. 61/027,550, filed Feb. 11, 2008, and U.S. Provisional Application No. 61/087,326, filed Aug. 8, 2008, the disclosures of which are fully incorporated herein by reference.

TECHNICAL FIELD

The present invention generally relates to signal processing. Specifically, the invention is directed to a technique for determining in a fading channel environment a scaling factor for soft bit quantization.

BACKGROUND

The $3^{rd}$ Generation Partnership Project (3GPP) is currently working on next generation telecommunications systems, which in the 3GPP terminology are called Long Term Evolution (LTE) systems. An important feature of LTE systems will be a high peak data rate of 100 Mbps and beyond. The high peak data rate is achieved by implementing, among other techniques, link adaptation and Hybrid Automatic Retransmission Request (Hybrid ARQ) schemes.

In short, link adaptation allows a base station to select modulation and coding parameters individually per user terminal based on the current channel quality. Hybrid ARQ schemes, on the other hand, enhance the acknowledgement, retransmission and time-out features of conventional ARQ schemes with forward error correction coding (using, for example, Turbo Codes) and with the transmission of error detection information (such as Cyclic Redundancy Check bits).

Hybrid ARQ schemes improve system throughput by combining (rather than discarding) information received via previous erroneous transmission attempts with information received with a current attempt. For this reason, Hybrid ARQ schemes require memory resources for temporarily storing the information received via the erroneous transmission attempts. The information that needs to be stored includes the received data bits as well as related reliability information (the so-called soft bits).

A soft bit is produced by a decoder front end for each data bit in the received signal and can be regarded as a measure of how likely it is that the data bit is a 0 or a 1. Accordingly, while a conventional decoder front end would simply decide if an internal analog voltage level is above or below a given threshold voltage level to identify the received analog information as either 0 or 1, the front end of, for example, a Turbo Code decoder would provide an integer measure (the soft bit) of how far the internal analog voltage is from the threshold voltage level.

The conventional "hard" decision and the improved "soft" decision techniques are illustrated in FIGS. 1A (PRIOR ART) and 1B (PRIOR ART), respectively. FIG. 1A and FIG. 1B both show the probability density p as a function of an analog voltage level $x(T)=m_i+n_0$, with $m_i$ being representative of the signal component and $n_0$ being representative of the noise component in the received signal. The voltage level $x(T)$ will have the mean value $m_1$ in case a 1 is transmitted, and the mean value $m_2$ in case a 0 is transmitted.

In the "hard" decision scenario shown in FIG. 1A, the level of $x(T)$ is simply compared with a given threshold voltage level to decide if 1 or 0 has been transmitted. In the exemplary "soft" decision scenario shown in FIG. 1B, on the other hand, eight soft bit quantizing ranges (corresponding to a resolution of 3 bits) are defined indicating how far the level of $x(T)$ is from the threshold value level. The word 111, for example, would indicate a decision for 1 with high reliability, while the word 100 would indicate a decision for 1 with low reliability. This additional reliability information generated in the "soft" decision scenario results in a reduced bit error rate compared to the "hard" decision scenario, or in a lower required Signal-to-Noise Ratio (SNR) for achieving the same bit error rate.

Increasing the resolution of soft bit quantization (up to a certain extent) helps to lower the bit error rate. However, an increased resolution also leads to increased memory requirements for Hybrid ARQ buffers because the soft bits have to be temporarily stored as outlined above. In particular in LTE and similar systems, the memory requirements for Hybrid ARQ schemes may thus get very demanding due to the inherently high peak data rates. Thus, smart methods have been proposed for reducing the resolution while maintaining the coding performance at a high level.

Such optimization methods as described for example in G. Jeong and D. Hsia, "Optimal Quantization for Soft-Decision Turbo Decoder", (VTC Fall '99), Amsterdam, The Netherlands, September 1999, typically require knowledge of the effective code rate and of the utilized modulation scheme. However, combined link adaptation and Hybrid ARQ-induced retransmission make it rather difficult to predict the effective code rate. This difficulty is mainly caused by the fact that at the time the "soft" decision has to be taken, the code rate selected by the link adaptation mechanism may not (yet) be known to the decision mechanism, and the decision mechanism also lacks knowledge whether or not (further) retransmissions are needed.

A further problem results from the fact that reliability information may get effectively lost depending on the current SNR as will now be explained in more detail. The mean value of the unquantized soft bit magnitude as well as its variance are basically proportional to the current SNR. This is illustrated for the example of Quadrature Phase Shift Keying (QPSK) and the SNR values of 0 dB and 6 dB in the soft bit histograms of FIGS. 2A (PRIOR ART) and 2B (PRIOR ART), respectively.

For a SNR value of 0 dB (FIG. 2A), the mean value is that small that the curves from both sides heavily overlap around the centre. As the magnitudes of the unquantized soft bit magnitudes are thus close to zero, the quantized soft bits will in most cases either be 0 or 1. For a SNR value of 6 dB (FIG. 2B), on the other hand, the magnitudes of the unquantized soft bits are mostly outside the allowed integer range, which results after clipping and quantization in soft bits assuming the maximum allowed integer values. In both cases, the available soft bit resolution is not utilized efficiently.

To compensate for the influence of the SNR on the soft bit quantization process, it is proposed in WO 2007/092744 A2 to scale the (analog) soft bit magnitude prior to the quantization step. The scaling step helps to ensure that the quantized soft bits make better use of the available integer value range. A scaling factor applied during the scaling is generally selected to be inversely proportional to a measured SNR value.

In fading channel environments, channel gain and hence the SNR is varying quickly. This means that the SNR varies even during one single code word. In LTE systems, which rely on Orthogonal Frequency Division Multiplexing (OFDM), the SNR may thus vary during one code word. In such situations it might be considered to derive the scaling factor based on a mean SNR value averaged over one code word. It has, however, been found that a simple averaging generally raises the problem that either soft bits corresponding to low SNR values or soft bits corresponding to high SNR values will have a sub-optimal precision (similar to the scenarios illustrated in FIGS. 2A and 2B).

SUMMARY

Accordingly, there is a need for a technique that permits a determination of a scaling factor for soft bit quantization such that the available soft bit resolution can be efficiently utilized.

According to a first aspect, a method of determining in a fading channel environment a scaling factor for soft bit quantization is provided. The method comprises repeatedly determining an SNR value for the fading channel, calculating a weighted average based on a plurality of the SNR values, wherein weighting of SNR values is performed such that contributions of extremal SNR values are attenuated, and determining the scaling factor for soft bit quantization dependent on the weighted average. As understood herein, the term "SNR" also encompasses related parameters associating signal and noise levels, such as the Signal-to-Interference plus Noise Ratio (SINR).

The weighting approach may lead to an at least partial non-linear averaging as a result of changing channel conditions. As an implicit consequence, changes in the operational points of coding and/or modulation mechanisms responsive to the changing channel conditions may be reflected in the calculated average.

In one implementation, each SNR value is weighted approximately according to an achievable channel throughput associated with the SNR value. Such a weighting may be an implicit or explicit result of the fact that the weighting is performed such that contributions of extremal SNR values are attenuated. The attenuation may be achieved in that very high SNR values and/or very low SNR values are weighted less than intermediate SNR values. As understood herein, extremal SNR values are not limited to (relative or absolute) minimum and/or maximum values. Rather, SNR values may also be regarded as extremal for example in cases in which they fulfil certain threshold conditions (e.g. in which they are above or below certain threshold values).

The weighted average may be calculated using an Effective SNR Metrics (ESM) technique as generally described, for example, in K. Brueninghaus et al., "Link Performance Models for System Level Simulations of Broadband Radio Access Systems", 2005 IEEE 16$^{th}$ International Symposium on Personal, Indoor and Mobile Radio Communications, p. 2306-2311. Possible ESM techniques that could be used in the present averaging context include Capacity ESM (CESM), Exponential ESM (EESM) and Mutual Information ESM (MIESM).

The averaging process may be preceded by a transformation step. Specifically, each SNR value may be weighted by transforming it into a code parameter domain or a modulation parameter domain. In one configuration, the weighting is performed by transforming each SNR value into a code rate domain to obtain an associated code rate value. The code rate values thus obtained may then be averaged in the code rate domain to obtain the average which will be weighted at least from the perspective of the SNR domain. The resulting weighted average may in a next step form the basis for determining the scaling factor for soft bit quantization.

In the case a transformation is selected which maps or otherwise transforms each SNR value onto an associated code rate value, the resulting code rate value may be indicative of an achievable code rate for the associated SNR value. The achievable code rate is representative of the achievable channel throughput associated with the related SNR value. The code rate value may, for example, be indicative of a cut-off rate associated with this SNR value.

The averaging may be performed over a series of consecutive SNR values. In one example, the averaging is performed over one code block containing a predefined number of modulation symbols (e.g., over one code block generated by a Turbo Code encoder). It should be noted that the averaging need not necessarily take into account an SNR value for each modulation symbol contained in the code block. Rather, the averaging may be limited to SNR values for a subset of the modulation symbols (e.g. each second or each fifth modulation symbol) contained in the code block.

The determination of the scaling factor based on the weighted average may be performed in various ways. In one implementation, a relationship associating individual weighted average values (or individual ranges of weighted average values) with individual scaling factors is provided. This relationship may be realised in the form of a mapping between discrete values (or individual ranges) and scaling factors, or in the form of a functional association.

In the case the underlying telecommunications system supports a plurality of modulation schemes, for each individual modulation scheme an individual relationship associating weighted average values (or ranges) and scaling factors may be defined. In such a scenario, the step of determining the scaling factor may further comprise determining the currently applied modulation scheme and selecting the relationship associated with this modulation scheme.

The scaling factor determination described herein may be performed in combination (or in context) with at least one of a link adaptation scheme and a Hybrid ARQ scheme.

Further, a computer program product comprising program code portions for performing the steps discussed herein when the computer program product is run on a computing device (such as a mobile terminal or a base station) is provided. The computer program product may be stored on a computer readable recording medium, such as a permanent or re-writable memory located within or associated with the computing device. Additionally, or in the alternative, the computer program product may be provided for download to the computing device, for example via a data network, such as the Internet, or a communication line, such as a telephone line or wireless link.

According to a still further aspect, a decoder stage configured to determine in a fading channel environment a scaling factor for soft bit quantization is provided. The decoder stage comprises a first component adapted to repeatedly determine an SNR value for the fading channel, a processor adapted to calculate a weighted average based on a plurality of the SNR values, wherein weighting of SNR values is performed such that contributions of extremal SNR values are attenuated, and a second component adapted to determine the scaling factor for soft bit quantization dependent on the weighted average calculated by the processor.

The processor may further be adapted to perform the weighting by transforming each SNR value into a system parameter domain (e.g. a code rate domain) to obtain an associated system parameter value (e.g. a code rate value). Moreover, the processor may be configured to average the resulting system parameter values to obtain the weighted average. As a further alternative, or additionally, the processor may be adapted to calculate the weighted average using an ESM technique, such as CESM, MIESM or EESM.

The second component may comprise a mapping table associating individual weighted average values (or ranges) with individual scaling factors. The mapping table may be realised in the form of a look-up table.

The decoder stage may be implemented in a receiver or transceiver component. The receiver or transceiver component may form a part of a mobile terminal (such as a mobile telephone, a network or a data card, a personal digital assistant, etc.) or a part of a base station (e.g., a NodeB or an evolved NodeB).

BRIEF DESCRIPTION OF THE DRAWINGS

In the following, the present invention will be described in more detail with reference to exemplary embodiments illustrated in the figures, wherein:

FIGS. 3A and 3B schematically illustrate in the form of block diagrams a modulator/decoder stage embodiment and a functional component thereof;

DETAILED DESCRIPTION OF EXEMPLARY EMBODIMENTS

In the following description, for purposes of explanation and not limitation, specific details are set forth, such as specific transformation scenarios, in order to provide a thorough understanding of the techniques presented herein. It will be apparent to one skilled in the art that the current invention may be practised in other embodiments that depart from these specific aspects. For example, the skilled artisan will appreciate that the present invention may be practised in combination with other transformation domains or with other communications standards.

Those skilled in the art will further appreciate that the functions explained herein may be implemented using individual hardware circuitry, using software functioning in conjunction with a programmed microprocessor or general purpose computer, using an Application Specific Integrated Circuit (ASIC) and/or using one or more Digital Signal Processors (DSPs). It will also be appreciated that, while the following embodiments will primarily be described in the form of methods and apparatuses, the embodiments may also be embodied in a computer processor and a memory coupled to the processor, wherein the memory is encoded with one or more programs that perform the steps discussed herein when executed by the processor.

FIG. 3A schematically illustrates an embodiment of a demodulator/decoder stage 300 that is configured to determine a scaling factor for soft bit quantization. The demodulator/decoder stage 300 may be incorporated in an LTE system component, such as an LTE-compliant user equipment (e.g. a mobile terminal) or base station. The LTE demodulator/decoder stage 300 operates in a system environment supporting link adaptation and Hybrid ARQ schemes.

As is well known, LTE systems use OFDM in the downlink from the base stations to the user equipment and Single Carrier Frequency Division Multiple Access (SC-FDMA) in the uplink from the user equipment to the base stations. SC-FDMA can be regarded as being a variant of OFDM. OFDM enables constructive superposition of signal replicas at different path delays by insertion of a cyclic prefix (as guard interval) and application of modulation and coding in the frequency domain. In order to realise the multipath gain, coded modulation has to be applied across frequency such that data on weak and strong OFDM sub-carriers, which result from multipath propagation, is protected within one code word. From a channel coding point of view, this scenario reflects the situation of coded transmission over a fading channel. This means that channel gains and hence SNR are varying within one code word. To compensate for the effect of a varying SNR on the decoding performance, the demodulator/decoder stage 300 of FIG. 3A is equipped with a soft bit scaling mechanism.

Figure 1A:
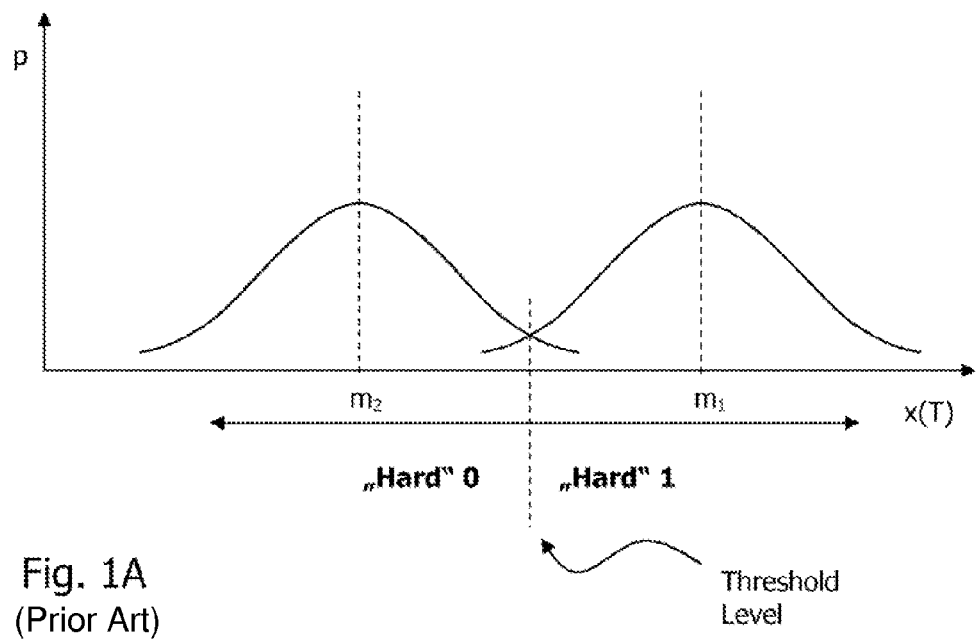
FIGS. 1A (PRIOR ART) and 1B (PRIOR ART) schematically illustrate "hard" and "soft" decision techniques, respectively.
Figure 1B:
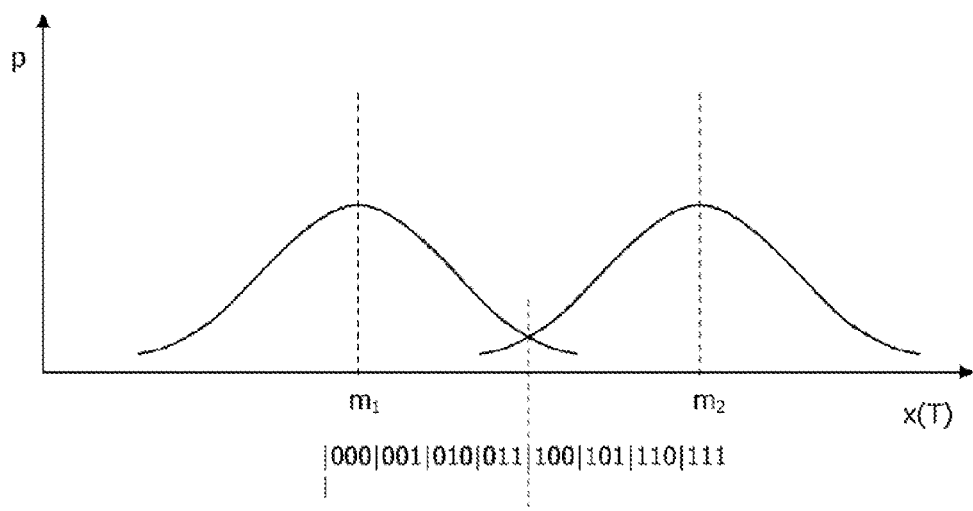
Figure 2A:
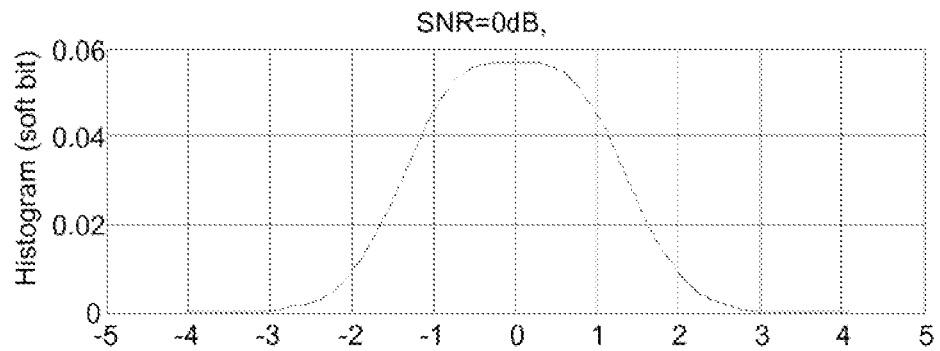
FIGS. 2A (PRIOR ART) and 2B (PRIOR ART) schematically illustrate soft bit histograms for different noise scenarios.
Figure 2B:
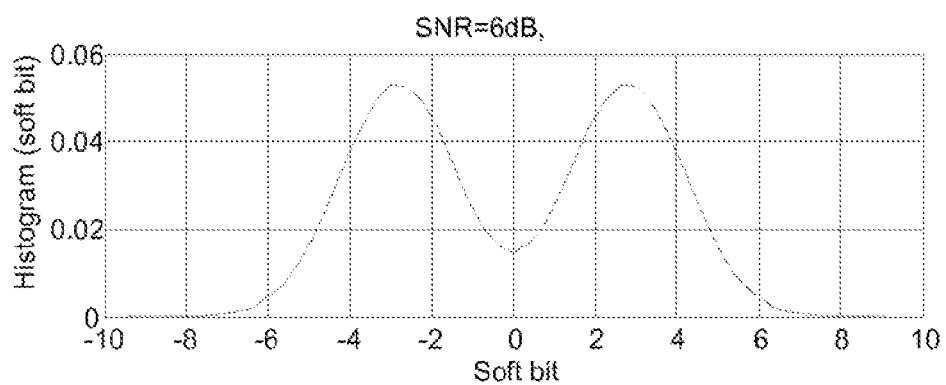

As shown in FIG. 3A, the demodulator/decoder stage 300 comprises a demodulator 302 at an input interface (not shown) for receiving a data signal over a fading channel. The demodulator 302 is coupled to a soft bit scaler 304 configured to scale the output of the demodulator 302 as required to allow for an efficient utilisation of the integer value range available for quantisation. A quantizer 306 is located downstream of the scaler 304 and configured to quantize the scaled soft bit magnitude output by the scaler 304. The resolution of the quantization performed by the quantizer 306 depends on the desired precision. For a desired precision of, for example, 5 bit, the quantizer 306 maps the soft bit magnitude output by the scaler 304 to an allowed integer value ranging from −16 to +15 as is known in the art (and generally illustrated in FIG. 1B for a precision of 3 bit). The soft bits thus generated by the quantizer 306 are output to a decoder 308. The decoder 308 may, for example, be configured as a Turbo decoder operating on a soft bit input.

As illustrated in FIG. 3A, the scaler 304 has an input for receiving scaling factor information. The scaling factor information is received from a scaling factor determination component 310 coupled to an SNR determination component 312. The SNR determination component 312 is configured to measure, estimate or otherwise determine the current noise and signal levels and to provide SNR values thus determined to the scaling factor determination component 310. The scaling factor determination component 310 is adapted to utilise the SNR values thus obtained for the purpose of determining the scaling factor information.

Figure 4:
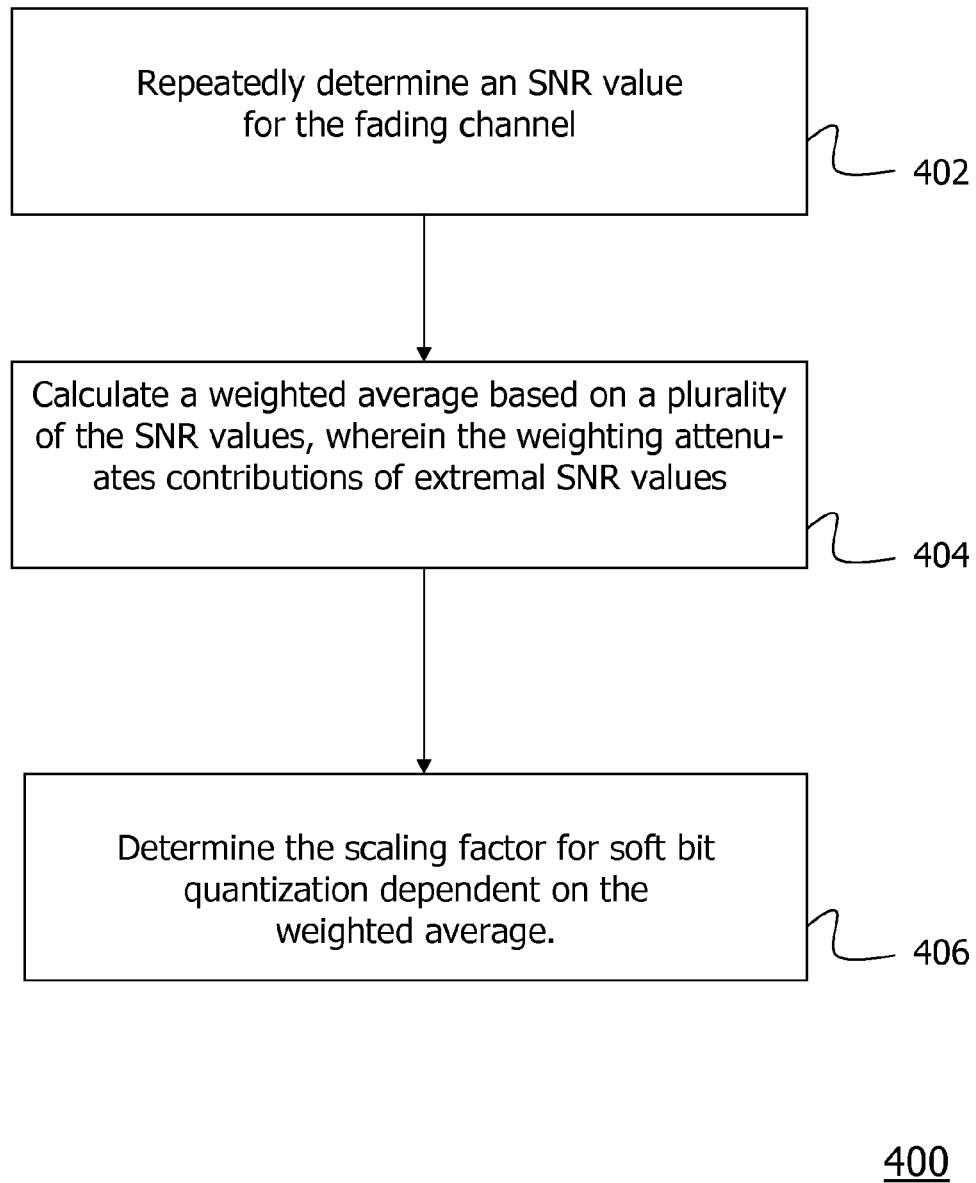
FIG. 4 shows a flow diagram schematically illustrating a method embodiment.

The configuration of the scaling factor determination component 310 will now be described in more detail with reference to the schematic block diagram of FIG. 3B. As shown in FIG. 3B, the scaling factor determination component 310 comprises a transformation component 320, an averaging component 322 as well as a mapping component 324. The structure and operation of the individual components shown in FIG. 3B will now be described in more detail with reference to the flow chart 400 of FIG. 4.

The operation of the scaling factor determination component 310 starts with constantly receiving SNR values from the SNR determination component 312. Accordingly, in step 402, the SNR determination component 312 repeatedly determines a an SNR value associated with the fading channel over which the data signal is received by the demodulator 302. In the present embodiment, the SNR determination component 312 determines the SNR, but in other embodiments the SINR or a similar parameter could be determined alternatively.

As illustrated in FIG. 3B, the scaling factor determination component 310 continuously receives individual SNR values $SNR_k$ from the noise determination component 312. The consecutively received SNR values are initially input to the transformation component 320. The transformation 320 is adapted to transform each SNR value into a code rate domain to obtain an associated code rate value $R_k$. This transformation allows to take the operational point of the coded modulation scheme applied in the LTE system into account for scaling factor determination. To this end, each SNR value is transformed into an associated code rate value indicative of the achievable throughput (or the achievable transmission rate) in the LTE system for the current SNR value.

The transformation function applied by the transformation component 320 is selected such that the contribution of extremal SNR values in the following averaging process is attenuated. This may be done by assigning a code rate close to zero to very low SNR values and a code rate close to the maximum rate of the coded modulation scheme currently in use to very high SNR values.

The corresponding rate transform function $f_R$ ($SNR_k$) may be artificially created such that the desired attenuation effects can be realised. According to an alternative implementation, the rate transform function $f_R$ ($SNR_k$) is selected as being representative of or approximating the cut-off rate $R_{0,Mod}$ ($SNR_k$) of the modulation scheme Mod currently is use.

Figure 5:
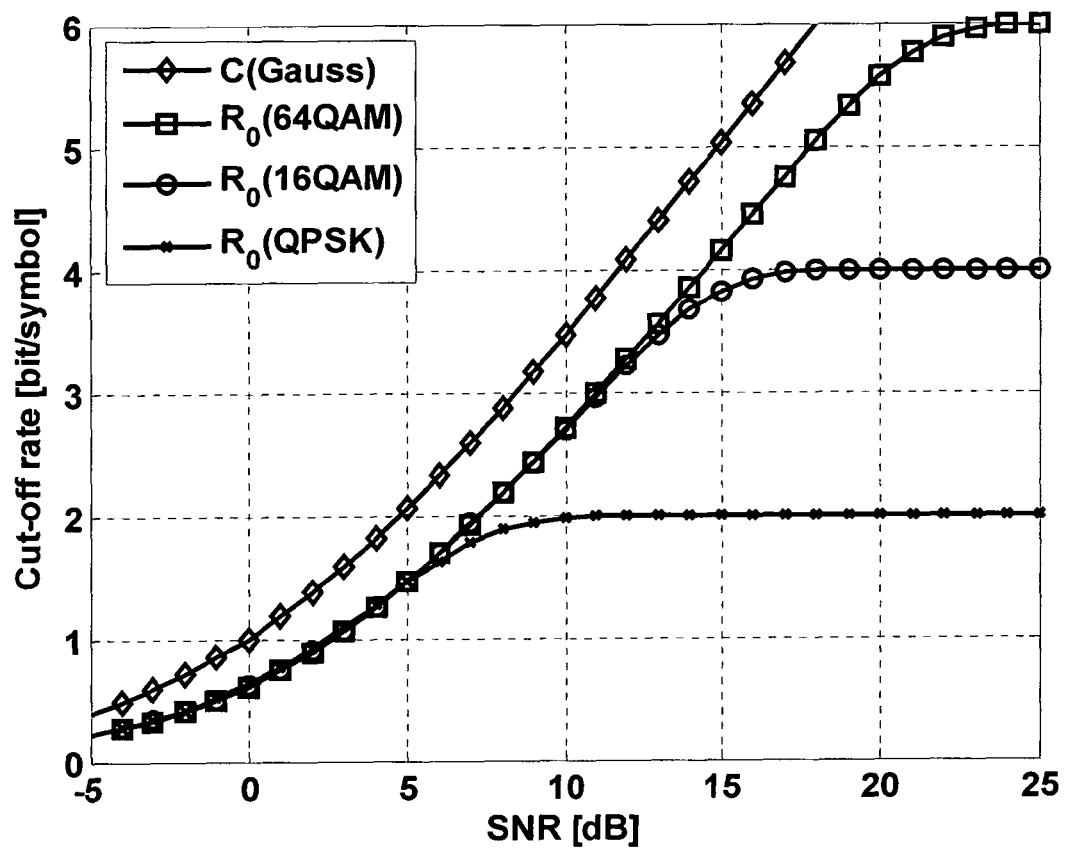
FIG. 5 shows a diagram schematically illustrating the transforma-tion between an SNR domain and a code rate domain.

The diagram of FIG. 5 illustrates the cut-off rates for several modulation schemes (QPSK, 16 QAM and 64 QAM) as a function of the SNR. As becomes apparent from FIG. 5, the cut-off rate has the desired characteristics of being close to zero for very low SNR values and approaching a maximum value for very high SNR values. In other words, the cut-off rate can be regarded as a parameter in the code rate domain providing the desired attenuation (or weighting) effects in the SNR domain.

As an optional measure, the functions of FIG. 5 may be adapted to the actual implementation of the decoder 308 shown in FIG. 3A. Specifically, the decoder 308 may have a characteristic somewhat better or worse than the theoretical functions illustrated in FIG. 5. For this reason, the applicable function of FIG. 5 might be shifted along the SNR axis depending on the actual decoder characteristic. As an alternative or additional measure, the input SNR values of the function may be scaled or offset depending on the actual decoder characteristic.

Turning again to FIG. 3B, the individual code rate values $R_k$ generated by the transformation component 320 are input to the averaging component 322. The averaging component 322 then averages the code rate values $R_k$ on a code block basis.

The averaging may generally be performed over all the modulation symbols within one code block (e.g., within one Turbo Code word). To save computational resources, there exists the option of down-sampling to less modulation symbols, such that only a subset of the modulation symbols contained in one code block is considered during the averaging process.

The averaging performed by the averaging component 322 can be expressed as $$\bar{R} = \frac{1}{K} \sum_k f_R(SNR_k).$$

The parameter K indicates the number of modulation symbols contained within one code block. In the present embodiment, the rate transform function $f_R$ ($SNR_k$)=$R_{0,Mod}$ ($SNR_k$)=$R_k$.

The averaging performed by the averaging component 322 can be regarded as a linear averaging performed in the code rate domain. However, from the perspective of the SNR domain, the averaging is performed in a non-linear manner because of the specific characteristics of the transform function. From the perspective of the SNR domain, the averaging expressed in the equation above represents the calculation of a weighted average based on a plurality of SNR values, with each SNR value being weighted according to the associated achievable channel throughput as expressed by the cut-off rate functions shown in FIG. 5 (step 404 in FIG. 4).

The averaging component 322 calculates for each code block an individual mean rate value $\bar{R}$. The mean rate values $\bar{R}$ thus calculated are fed to the mapping component 324 as illustrated in FIG. 3B. The mapping component 324 determines a scaling factor for soft bit quantization for each mean rate value $\bar{R}$. Since the mean rate value $\bar{R}$ represents a weighted average in the noise domain, the scaling factor is effectively determined dependent on a weighted average of the initial SNR values as an $R_k$ (step 406 in FIG. 4).

The mapping operation performed by the mapping component 324 is performed based on an internal mapping table associating individual mean rate values $\bar{R}$ with individual soft bit scaling factors $Q_s$. If the table does not include a table entry for the specific mean rate value $\bar{R}$ received from the averaging component 322, the table entry closest to the received mean rate value $\bar{R}$ can be chosen for scaling factor determination. Alternatively, the table could associate individual ranges of mean rate values $\bar{R}$ with individual scaling factors $Q_s$.

If several modulation schemes can be applied in the communications system, for each individual modulation scheme a separate mapping table can be provided. The table look-up operation performed by the mapping component 324 can thus mathematically be expressed as follows:

$$Q_S = \text{LUT}_{Q,Mod}(\bar{R}).$$

Because of the non-linear averaging of the SNR in the code rate domain, the look-up tables accessed by the mapping component 324 can be the same as those provided for flat channel conditions (i.e., for non-fading environments). Accordingly, the same tables can be re-used for both fading and non-fading environments.

In the exemplary embodiment described above, the scaling factor determination component 310 transforms SNR values into the code rate domain prior to the averaging step. It should be noted that the averaging could also be performed in the SNR domain using for example a weighting approach that involves an ESM technique. According to a still further variant, the averaging in the SNR domain could involve SNR value clipping such that all SNR values below a lower threshold are mapped to an SNR value of or above the lower threshold, and all SNR values above an upper threshold are mapped to an SNR value of or below the upper threshold. Any SNR values between the two thresholds may remain unaltered (i.e., are not mapped). The following averaging process then involves both the mapped (i.e., weighted) and non-mapped SNR values.

The averaging process described herein has the advantage that the operational point of the coded modulation mechanism is taken into account when determining the scaling factor. For low code rates, it can thus be ensured that the resolution of soft bits associated with high SNR values is maintained. For high codes rates, on the other hand, the resolution of soft bits associated with low SNR values is preserved. As a result of this strategy, the precision of soft bits can be optimised and the memory requirements for the Hybrid ARQ buffer will decrease.

In certain implementations, the final determination of the scaling factor can be easily implemented by a table look-up operation. Advantageously, no new tables have to be necessarily defined as existing tables for flat channels and known code parameters may be re-used. This re-use is a result of the non-linear averaging which limits contributions of low and high SNR values. The averaging can advantageously be performed in the rate domain, and the non-linear relationship may be implemented simply by selecting a suitable transfer function.

A further advantage is the fact that decoding performance can be optimised per code block. In other words, for each individual code block a dedicated scaling factor can be selected.

Although the present invention has been described in connection with exemplary embodiments, it is not intended to be limited to the specific details discussed herein. Rather, the scope of the present invention is limited only by the accompanying claims.

The invention claimed is:

1. A method of determining in a fading channel environment a scaling factor for soft bit quantization, the method implemented by a decoder stage comprising steps of:
repeatedly determining a Signal-to-Noise Ratio (SNR) value for the fading channel;
calculating a weighted average based on a plurality of the SNR values, wherein the weighting of the SNR values is performed such that contributions of extremal SNR values are attenuated;
determining the scaling factor for soft bit quantization dependent on the weighted average; and
wherein the weighting is performed by a transformation configured to transform each SNR value into a code rate domain to obtain an associated code rate value, and
wherein the method further comprises averaging the resulting code rate values to obtain the weighted average.

2. The method of claim 1, wherein each SNR value is weighted according to an associated achievable channel throughput.

3. The method of claim 1, wherein the weighted average is calculated using an Effective SNR Metric technique.

4. The method of claim 1, wherein each code rate value is indicative of an achievable code rate for the associated SNR value.

5. The method of claim 1, wherein the code rate value is indicative of a cut-off rate associated with the specific SNR value.

6. The method of claim 1, wherein the averaging is performed over one code block containing a predefined number of modulation symbols.

7. The method of claim 6, wherein the averaging is taking into account only a subset of the modulation symbols contained in the code block.

8. The method of claim 1, wherein determining the scaling factor comprises consulting a relationship associating individual weighted average ranges or values with individual scaling factors.

9. The method of claim 8, wherein for each of a plurality of modulation schemes an individual relationship is provided, and wherein the step of determining the scaling factor further comprises selecting the relationship associated with the currently applied modulation scheme.

10. The method of claim 1, wherein the method is performed in combination with at least one of a link adaptation scheme and a Hybrid Automatic Retransmission Request (Hybrid ARQ) scheme.

11. A non-transitory computer-readable medium which has an executable computer program product stored thereon, the computer program product comprising program code portions to be processed by a computing device for determining in a fading channel environment a scaling factor for soft bit quantization by:
repeatedly determining a Signal-to-Noise Ratio (SNR) value for the fading channel;
calculating a weighted average based on a plurality of the SNR values, wherein the weighting of the SNR values is performed such that contributions of extremal SNR values are attenuated;
determining the scaling factor for soft bit quantization dependent on the weighted average; and
wherein the weighting is performed by a transformation configured to transform each SNR value into a code rate domain to obtain an associated code rate value, and wherein the method further comprises averaging the resulting code rate values to obtain the weighted average.

12. A decoder stage configured to determine in a fading channel environment a scaling factor for soft bit quantization, comprising:
a first component configured to repeatedly determine a Signal-to-Noise Ratio (SNR) value for the fading channel;
a processor configured to calculate a weighted average based on a plurality of the SNR values, wherein the weighting of the SNR values is performed such that contributions of extremal SNR values are attenuated;
a second component configured to determine the scaling factor for soft bit quantization dependent on the weighted average; and
wherein the processor is configured to perform the weighting by transforming each SNR value into a code rate domain to obtain an associated code rate value, and to average the resulting code rate values to obtain the weighted average.

13. The decoder stage of claim 12, wherein the processor is configured to calculate the weighted average using an Effective SNR Metric technique.

14. The decoder stage of claim 12, wherein the second component comprises a mapping table associating individual ranges or values of the weighted average with individual scaling factors.

15. A decoder stage configured to determine in a fading channel environment a scaling factor for soft bit quantization, comprising
a first component configured to repeatedly determine an SNR value for the fading channel;
a first processing unit configured to transform each SNR value into a code rate domain to obtain an associated code rate value;
a second processing unit configured to calculate an average based on a plurality of the transformed SNR values, and perform a weighting such that in the calculated average contributions of extremal SNR values are attenuated, and
a second component configured to determine the scaling factor for soft bit quantization dependent on the average.

* * * * *